United States Patent
Dolgov et al.

(10) Patent No.: US 11,247,674 B2
(45) Date of Patent: Feb. 15, 2022

(54) METHOD FOR COOPERATIVE MANEUVER COORDINATION

(71) Applicant: Robert Bosch GmbH, Stuttgart (DE)

(72) Inventors: Maxim Dolgov, Renningen (DE); Thomas Michalke, Weil der Stadt (DE); Florian Wildschuette, Hildesheim (DE); Hendrik Fuchs, Hildesheim (DE); Ignacio Llatser Marti, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 260 days.

(21) Appl. No.: 16/573,303

(22) Filed: Sep. 17, 2019

(65) Prior Publication Data
US 2020/0094819 A1    Mar. 26, 2020

(30) Foreign Application Priority Data
Sep. 20, 2018  (DE) .................. 102018216082.1

(51) Int. Cl.
*B60W 30/09* (2012.01)
*H04W 4/46* (2018.01)
(Continued)

(52) U.S. Cl.
CPC ........ *B60W 30/09* (2013.01); *B60W 30/0956* (2013.01); *G05D 1/0088* (2013.01);
(Continued)

(58) Field of Classification Search
CPC ............. B60W 30/09; B60W 30/0956; B60W 2556/65; B60W 2556/80; H04W 4/46;
(Continued)

(56) References Cited

U.S. PATENT DOCUMENTS

| | | | | |
|---|---|---|---|---|
| 10,235,882 B1* | 3/2019 | Aoude | ................ | G08G 1/0137 |
| 2010/0256836 A1* | 10/2010 | Mudalige | ............... | G08G 1/164 |
| | | | | 701/2 |
| 2013/0099911 A1* | 4/2013 | Mudalige | ............... | G08G 1/166 |
| | | | | 340/438 |
| 2013/0325306 A1* | 12/2013 | Caveney | ................ | G08G 1/166 |
| | | | | 701/117 |

(Continued)

FOREIGN PATENT DOCUMENTS

| | | |
|---|---|---|
| DE | 102012218935 A1 | 4/2013 |
| DE | 102014215980 A1 | 2/2016 |

(Continued)

*Primary Examiner* — Yazan A Soofi
(74) *Attorney, Agent, or Firm* — Norton Rose Fulbright US LLP; Gerard Messina

(57) ABSTRACT

A method is provided for maneuver planning and implementation for a vehicle by a vehicle-internal control unit. The control unit includes a strategic planning level for carrying out route planning, a tactical planning level for providing lane-accurate trajectories to possible destination points, and an operative planning level for selecting a destination point and a negotiable trajectory to the selected destination point. The planning levels have a cascading design. When each planning level is executed, an information exchange with neighboring vehicles is carried out via a communication link in order to ascertain collisions. When a collision is ascertained in at least one planning level, a maneuver coordination is carried out between the vehicles via the communication link. Moreover, a control unit is provided.

10 Claims, 5 Drawing Sheets

(51) Int. Cl.
*B60W 30/095* (2012.01)
*G05D 1/00* (2006.01)
*G05D 1/02* (2020.01)
*G08G 1/16* (2006.01)

(52) U.S. Cl.
CPC .......... *G05D 1/0212* (2013.01); *G08G 1/161* (2013.01); *G08G 1/166* (2013.01); *H04W 4/46* (2018.02); *B60W 2554/80* (2020.02); *B60W 2556/65* (2020.02)

(58) Field of Classification Search
CPC ...... G08G 1/0088; G08G 1/161; G08G 1/166; G05D 1/0212
USPC .......................................................... 701/301
See application file for complete search history.

(56) References Cited

U.S. PATENT DOCUMENTS

| | | | |
|---|---|---|---|
| 2018/0075309 A1* | 3/2018 | Sathyanarayana | G05D 1/0055 |
| 2018/0321689 A1* | 11/2018 | Lehmann | B60W 30/00 |
| 2019/0258251 A1* | 8/2019 | Ditty | G06K 9/00805 |
| 2020/0042013 A1* | 2/2020 | Kelkar | G05D 1/0287 |
| 2020/0042017 A1* | 2/2020 | Kelkar | G01S 5/0284 |
| 2020/0133307 A1* | 4/2020 | Kelkar | G08G 1/22 |
| 2020/0137536 A1* | 4/2020 | Nguyen | H04W 72/005 |
| 2020/0290619 A1* | 9/2020 | Mehdi | B60W 30/18163 |

FOREIGN PATENT DOCUMENTS

| | | |
|---|---|---|
| DE | 102015221817 A1 | 5/2017 |
| DE | 102018109885 A1 | 12/2018 |

* cited by examiner

METHOD FOR COOPERATIVE MANEUVER COORDINATION

FIELD OF THE INVENTION

The present invention relates to a method for maneuver planning and implementation for a vehicle by a vehicle-internal control unit, and a control unit.

BACKGROUND INFORMATION

Conventional systems that allow automated driving are known that plan vehicle trajectories only for the ego-vehicle in question, taking the behavior of other road users into account.

In addition, there have been efforts to use communication between vehicles to achieve cooperative maneuver planning and maneuver implementation. The aim, among other things, is to increase safety and comfort and to reduce fuel consumption.

In previous attempts to integrate communication between vehicles into the planning of the trajectory, it has been problematic that an efficient implementation provides message exchange only between vehicles that are a short distance from one another. Thus, a cooperative maneuver coordination is limited to only a few scenarios. In addition, longer prediction times for trajectories, for example greater than 5 seconds, is presently not achievable with nonautomated vehicles in mixed traffic.

SUMMARY

An object underlying the present invention may be regarded as providing a method for a maneuver coordination which is applicable for trajectories even for longer prediction times.

According to one aspect of the present invention, a method for maneuver planning and implementation for a vehicle by a vehicle-internal control unit is provided. The control unit includes a strategic planning level for carrying out route planning, a tactical planning level for providing lane-accurate trajectories to possible destination points, and an operative planning level for selecting a destination point and a negotiable trajectory to the selected destination point. The planning levels have a cascading design; when at least one planning level, in particular each planning level, is executed, an information exchange with neighboring vehicles is carried out via a communication link in order to ascertain collisions. When a collision is ascertained in at least one planning level, a maneuver coordination is carried out between the vehicle and the at least one neighboring vehicle via the communication link.

According to another aspect of the present invention, a control unit for controlling at least one vehicle and for establishing a communication link between at least two vehicles is provided, the control unit being configured for carrying out all steps of the method.

The communication link is preferably a vehicle-to-X (V2X) communication. This V2X communication encompasses vehicle-to-vehicle (V2V) communication, as well as vehicle-to-infrastructure (V2I) communication between a vehicle and an infrastructure unit. By use of the communication link, the planning information of the individual vehicles may be exchanged, compared, and checked in the individual planning levels with regard to collisions.

A trajectory is preferably a function that maps time (in the validity range) to the position of the vehicle. In the simplest case, the position is made up of the coordinates of the vehicle in two-dimensional space. However, the position may also encompass an orientation and further variables. Furthermore, the time may be defined as a discretized function.

The position, as a state of the vehicle, in the strategic level may be made up of information about the instantaneous expressway section/expressway kilometer, and in the tactical level may be made up of the lane information, the position on the lane (for example, the arc length from the start point of the lane in the instantaneous expressway section), and the longitudinal speed along the lane. In the operative level, the state may be made up of the position (position and orientation) in a Cartesian coordinate system or a Frenet coordinate system along the vehicle lane, the yaw rate, the longitudinal and transverse speeds, and the longitudinal and transverse accelerations.

A collision is present for vehicles in the same lane when, for example, a longitudinal distance along the lane falls below a minimum distance. For neighboring lanes, a collision is present when a longitudinal distance as well as a lateral distance fall below a minimum distance.

The maneuvers may be carried out in three different planning levels. A strategic planning level is used, for example, for route planning for the individual vehicles. The middle, tactical planning level may specify particular destination points that the vehicles must cover within the scope of their strategic routes. The specific negotiable trajectories may be planned on the operative planning level, for example for a period of approximately 0-10 seconds.

The respective planning levels are designed as a cascade. It may thus be possible via the communication link to decentrally coordinate cooperative driving maneuvers within a group of vehicles. In the process, a cascade of the planning levels made up of strategic, tactical, and operative planning is run through. The particular planning levels may have a hardware-based design as separate modules of the control unit. The particular modules may be coupled to one another in a data-transmitting manner via interfaces, and may access a communication unit of the control unit. Alternatively, the planning levels may be designed in the form of software modules, which via a software-hardware interface may utilize the communication unit of the control unit.

The information exchange between the vehicles at each planning level via a communication link for ascertaining collisions may be summarized in the form of a message.

The method encompasses, for example, a cooperative maneuver coordination within a group of vehicles, using the communication link or multiple communication links. The coordination may take place on a strategic planning level that specifies the route plan or the final driving destination (for example, Karlsruhe-Stuttgart-Augsburg-Munich). The strategic planning level may be used to carry out long-term route planning.

A destination point specification may be handled on a tactical planning level, starting from pieces of information received via the communication link and the pieces of information from the strategic planning level (for example, a lane change at the end of an entrance ramp) which the cooperation partners select. The tactical planning level may thus be used for medium-term planning tasks of the route planning.

On the operative planning level, planning of the negotiable trajectory for a period of 0 to 10 seconds, for example, may be carried out based on pieces of information exchanged via the communication link and the pieces of information from the tactical planning level. The operative planning level is thus used for short-term or immediate route planning, and may be designed for carrying out a subsequent implementation of the planned route, or transmitting the planned route to an appropriate vehicle control unit.

An implementation of the coordination on the operative planning level may be carried out, for example, by adapting at least one desired or planned trajectory of one or multiple vehicles.

According to one exemplary embodiment, at least two vehicles each include an internal control unit that includes planning levels, a communication link being established between the vehicles in order to carry out a cooperative maneuver coordination when a collision is ascertained in at least one planning level. At least two vehicles that are situated within a range of the communication link may preferably exchange pieces of information with one another during the execution of the planning levels for the route planning. The control units of the particular vehicles may preferably communicate with one another. The control units are designed in such a way that the particular planning levels of different control units may communicate with one another separately. The particular planning levels are executed by the control units in a stepwise manner in succession so that an information exchange may take place during each planning level. Alternatively or additionally, the control units may access pieces of information from planning levels that have already concluded, or may carry out a synchronization via which the particular planning levels are carried out once again simultaneously by multiple control units.

According to one specific embodiment, when a collision is ascertained in at least one planning level, the planning levels above this planning level are not taken into account in the maneuver coordination. Thus, preference is given to the collision on the lowest planning level. If a collision of planned trajectories is determined on the strategic planning level, for example, this vehicle is defined as the cooperation partner. Lastly, the trajectory and the destination point are exchanged on the tactical level.

According to another embodiment, at least two vehicles are selected as cooperation partners when a collision is determined in at least one of their planning levels. For example, a vehicle may receive data of the strategic and operative planning or of planning levels of equipped vehicles. Collisions of the trajectories may be ascertained in the planning levels via a location-based and time-based comparison. The vehicles between which a collision has been ascertained are thus considered as cooperation partners. The cooperation partners then use the established communication link to ascertain a collision-free trajectory. For this purpose, for example one or multiple vehicles may adapt their trajectories to one another so that a decentralized solution of the collision problem may be ascertained and executed in advance.

According to another specific embodiment, when a collision is determined, a maneuver coordination between the at least two vehicles is carried out by adapting a trajectory of at least one vehicle. When a collision is determined, a coordination is made with regard to which vehicle is, for example, making a lane change and/or is preceding. On the operative planning level, the vehicles may, for example, be free in principle and may have to carry out a coordination only at collisions. The method is not limited to the lane change scenario. Further scenarios may be, for example, turning onto a street with right of way, convoys, passing on highways, resolving conflicts at an intersection without right-of-way stipulations, and the like.

According to another specific embodiment, the communication link between the at least two vehicles is maintained after a maneuver coordination is carried out. In this way the cooperation partners may remain connected in order to exchange information. Subsequent corrections may thus also be made.

According to another specific embodiment, the information exchange includes planned trajectories with destination points and destination times. All relevant pieces of information concerning routes and intermediate destinations of the vehicles may thus be exchanged via the communication link so that a collision check may be carried out.

According to one exemplary embodiment, in the tactical planning level it is determined which vehicle is the preceding vehicle in the collision area. For this purpose, it may be decided, for example, when the lane change takes place (in terms of location and time), and which is the preceding vehicle. In addition, traffic regulations and other regulatory requirements of the particular country may be taken into account on the tactical planning level.

According to another specific embodiment, for at least one collision that is determined in a planning level, the lowest planning level that includes a collision is used for a cooperative maneuver coordination, the higher planning levels being operated in an automated mode. The particular unused planning levels may be transferred into a so-called autopilot mode in which they carry out basic tasks such as computing destination points along the center of the lane, and relay the results of the basic tasks to the subsequent cascades or planning levels.

The method may also be used in an adapted form for coordinating cooperative driving maneuvers, for example for the following functions.

cooperative merging in and out, and merge areas
cooperative distance control to preceding vehicles
cooperative passing on a highway
cooperative predictive routing via highways
cooperative turning on highways
cooperative truck passing maneuvers on an expressway.

As a result of the coordination taking place on the strategic, tactical, and operative planning levels, all the mentioned functions may be taken into account by the method. Depending on the function, it may be necessary to influence only one of the planning levels, so that the implementation effort, and thus the susceptibility to error, may be reduced.

Preferred exemplary embodiments of the present invention are explained in greater detail below with reference to highly simplified illustrations.

DETAILED DESCRIPTION

Figure 1:
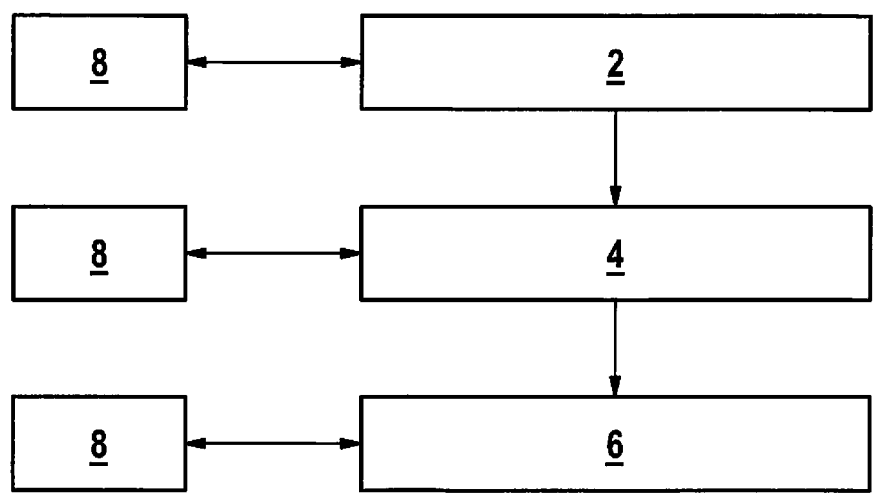
FIG. 1 shows a schematic illustration of planning levels.

An overview of planning levels 2, 4, 6 is illustrated in FIG. 1. For each planning level 2, 4, 6, an information exchange 8 takes place between the control units of the involved vehicles in method 1.

Information exchange 8 preferably takes place via a communication link, which may be a V2X communication link.

A strategic planning level 2 is used for long-term route planning for a final driving destination of a vehicle. A tactical planning level 4 subsequent to strategic planning level 2 generates, for example, destination point specifications, and may select cooperation partners for the method. Tactical planning level 4 is used for medium-term planning of a route, for example, to the next highway section. An operative planning level 6 subsequent to tactical planning level 4 is used for short-term or immediate maneuver planning for a time frame of 0 to 10 seconds.

The particular planning levels 2, 4, 6 are designed as a cascade. It may thus be possible to carry out an information exchange 8 via a communication link 18 illustrated in FIGS. 2 through 5. In particular, cooperative driving maneuvers within a group of vehicles may be decentrally coordinated via information exchange 8. The particular planning levels 2, 4, 6 may have a hardware-based design as separate modules of a control unit 16. The particular modules may be coupled to one another in a data-transmitting manner via interfaces, and may access a communication unit of control unit 16. Alternatively, planning levels 2, 4, 6 may be designed in the form of software modules, in particular separate software programs, which via a software-hardware interface may utilize a communication unit (not illustrated) of control unit 16.

FIGS. 2 through 5 show schematic illustrations of two vehicles 10, 12 that are carrying out cooperative maneuver planning on an expressway entrance ramp 14. Vehicles 10, 12 each include a control unit 16 that may establish a communication link 18 between vehicles 10, 12 or an infrastructure, not illustrated, for the purpose of information exchange, and are designed for carrying out method 1. Control unit 16 includes planning levels 2, 4, 6, and may carry out the corresponding steps and appropriately control or instruct vehicles 10, 12.

Figure 2:
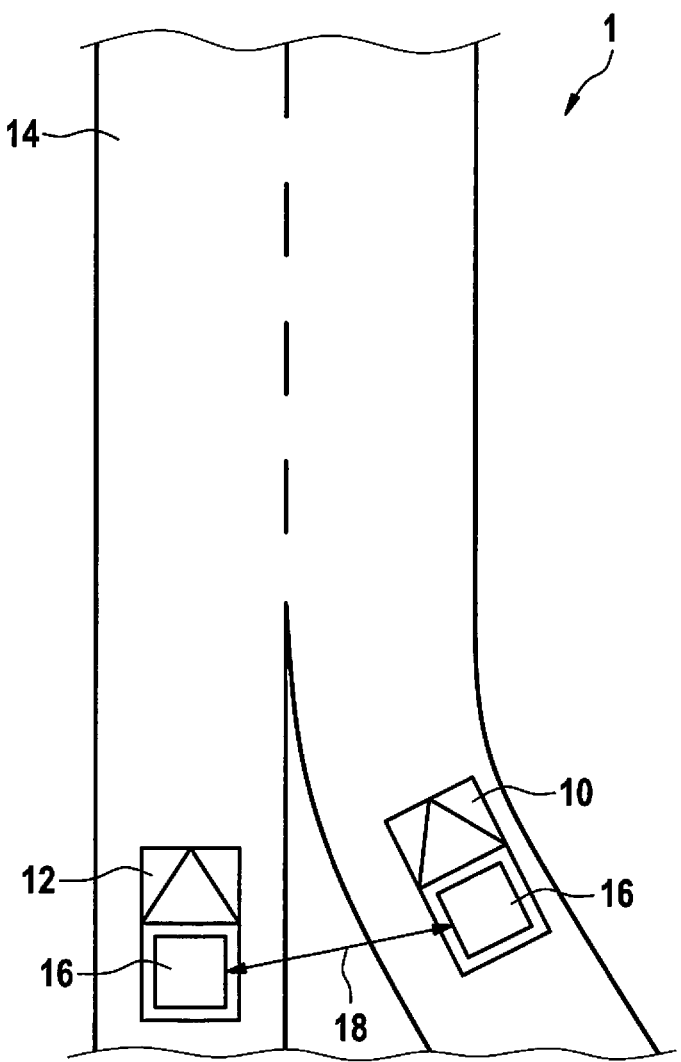
FIGS. 2 through 5 show schematic illustrations of an entry onto an expressway for explaining a method according to one specific embodiment.

Method 1 is described below with reference to an entrance ramp scenario on an expressway 14 or a thruway. FIG. 2 illustrates a scenario in which a vehicle 10, the so-called ego-vehicle, would like to enter the lane of an expressway or a thruway having right of way, on which another vehicle 12, the so-called cooperation vehicle, may enter.

According to the exemplary embodiment, the maneuver coordination between the two vehicles 10, 12 is implemented from the viewpoint of ego-vehicle 10 as follows:

In a starting situation, a route plan is present in strategic planning level 2 which provides a lane change onto expressway 14 in the form of an intermediate point 20 of strategic route 22. Depending on the implementation of the route plan, one intermediate point 20 may be on the entrance ramp lane, while the next intermediate point is situated at a location after entry onto expressway 14. For multilane expressways, this point is not necessarily bound to one of the lanes, and instead merely indicates the expressway kilometer. A destination point (spatial and temporal) for the lane change onto expressway 14 is computed in tactical planning level 4. A lane-accurate location in the center of the lane is provided. Tactical trajectory 24 to this point 20 leads along the center of the lane, and initially masks other road users 12. On operative planning level 6, a trajectory 26 for the next 0 to 10 seconds is computed according to the specifications of tactical planning level 4 and is relayed to the vehicle actuator system. The specifications of tactical planning level 4 may include destination points 20 (spatial and temporal) along tactical trajectory 24 as well as the tactical trajectory itself, which may be achieved according to the vehicle dynamics. Operative planning level 6 is responsible for selecting the suitable destination point and a negotiable trajectory 24 to this destination point.

Figure 3:
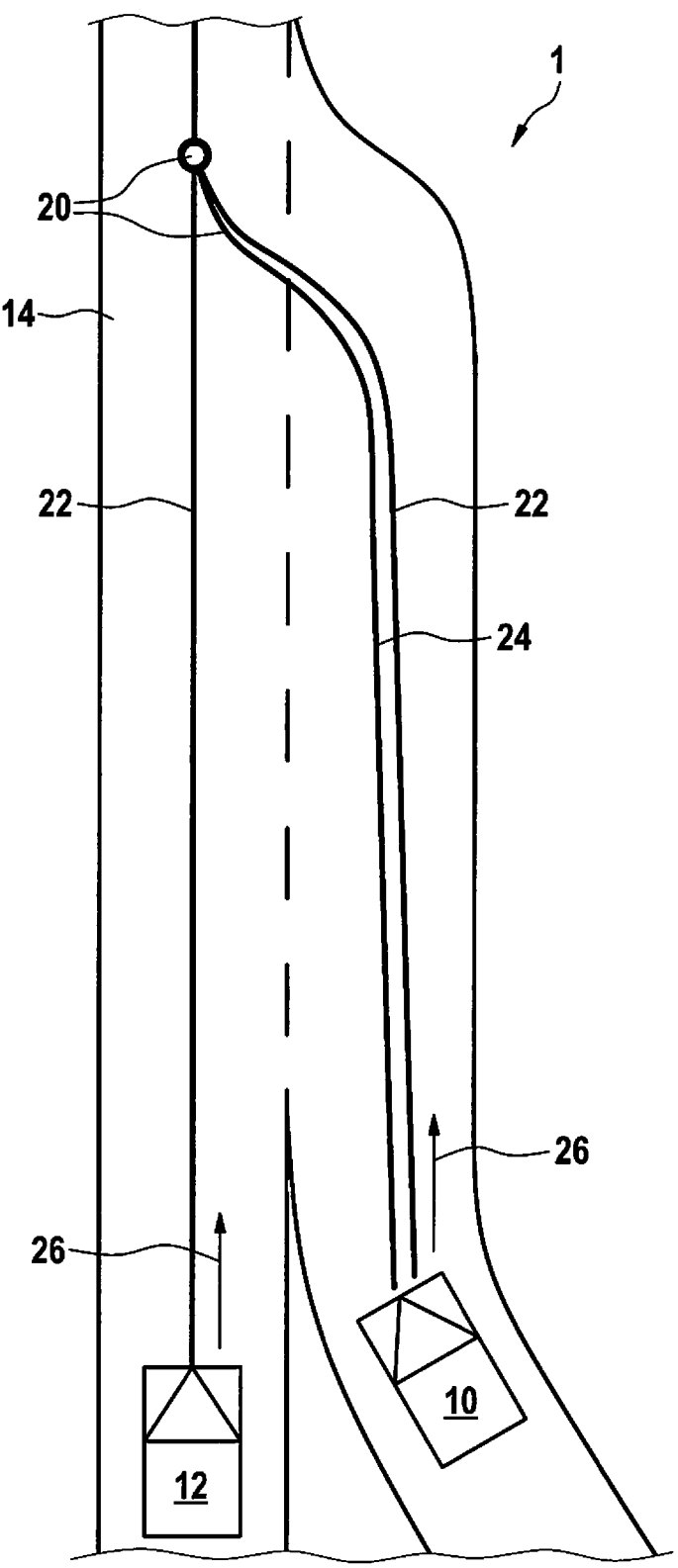

A collision detection is carried out on strategic planning level 2, as illustrated in FIG. 3. Ego-vehicle 10 receives data of strategic planning level 2 and operative planning level 6 from appropriately equipped vehicles 12. A cascade 2, 4, 6 determines the lowest planning level (operative to tactical (not available initially) to strategic) on which a collision takes place (in the present case, strategic planning level 2). All levels above that no longer require consideration.

Vehicles 10, 12, via which a collision on strategic planning level 2 takes place, are selected as possible cooperation partners. The other vehicles, such as those which have left expressway 14 at a previous exit, not depicted here, are no longer considered.

The tactical planning in control unit 16 of vehicle 12 on expressway 14 is activated via communication link 18. For this purpose, ego-vehicle 10 transmits a tactical trajectory 24 together with its destination point 20 (spatial and temporal) to cooperation vehicle 12.

Figure 4:
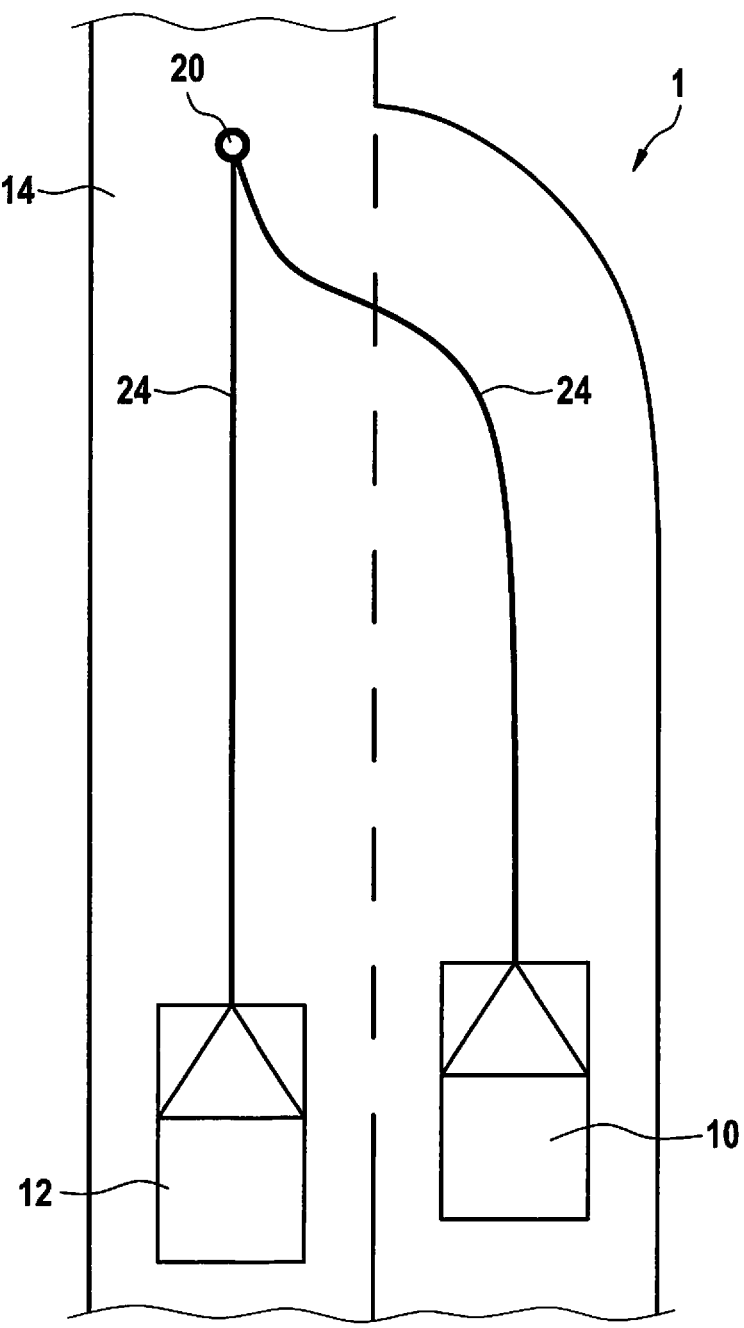

A collision is ascertained on tactical planning level 4, as shown in FIG. 4. The activation of tactical planning level 4 in cooperation vehicle 12 triggers the computation of tactical trajectory 24 by cooperation vehicle 12, which transmits same to ego-vehicle 10. Both vehicles 10, 12 determine a collision of their tactical trajectories 24 and enter into a cooperation.

The coordination takes place on tactical planning level 4. For this purpose, it is decided when the lane change can take place (spatially and temporally), and which vehicle 10, 12 is preceding. In addition, the requirements of traffic regulations are considered on tactical planning level 4. According to the exemplary embodiment, the zipper method, for example, is applied.

The plan on operative planning level 6 is free of collisions here, and may therefore be carried out individually by vehicles 10, 12.

Figure 5:
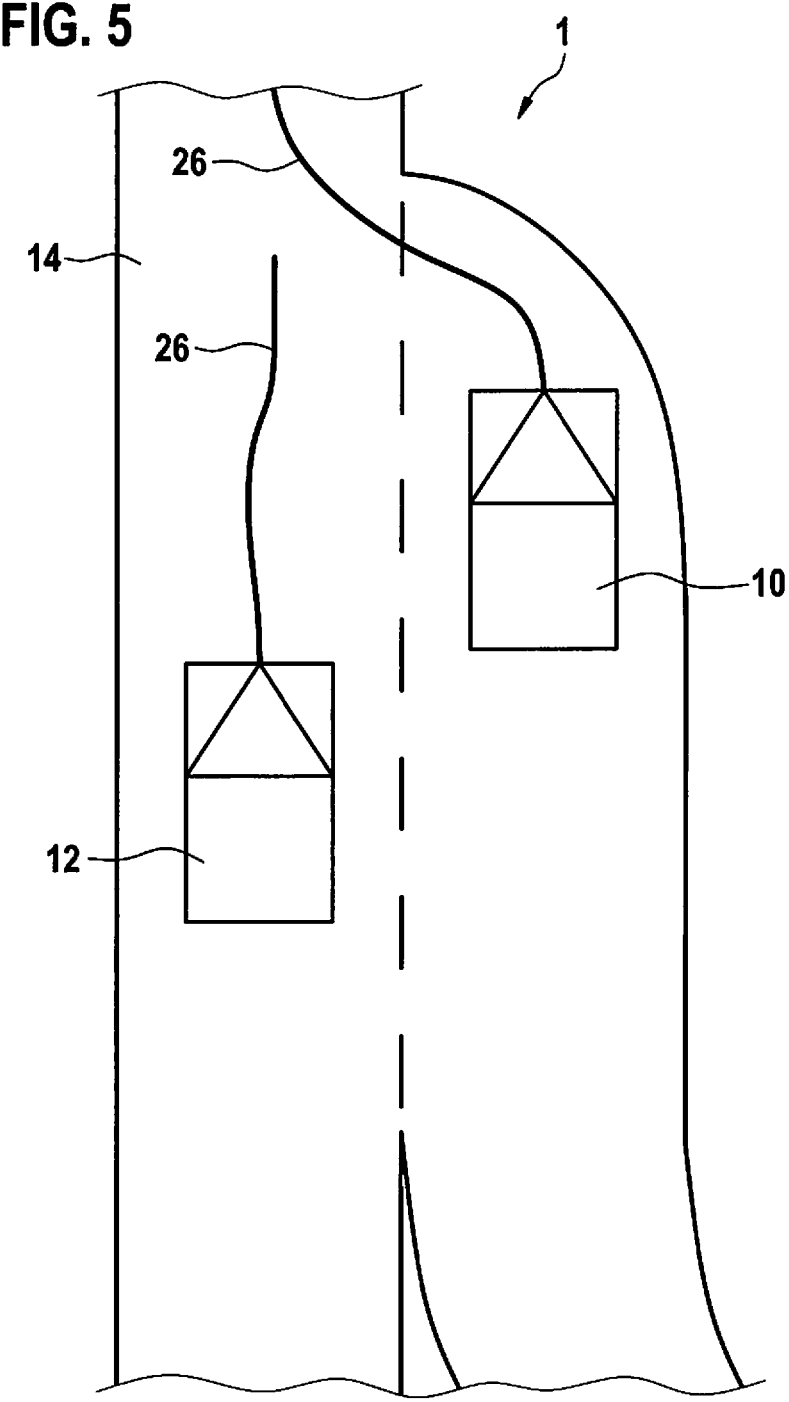

FIG. 5 shows the avoidance of a collision on operative planning level 6. After the collision has been resolved on tactical planning level 4, the planning units or control units 16 in both vehicles 10, 12 determine collisions on operative planning level 6. These collisions may arise, for example, because tactical planning level 4 models vehicle 10 as a point mass and guides tactical trajectory 24 along the center of the lanes, whereas operative trajectories 26, which are actually negotiated, take into account the vehicle dimensions as well as deviations from the center of the lanes, and detect collisions due to these influences.

Since a collision has been determined on operative planning level 6, with a collision this planning level 6, as the lowest cascade level, takes over the coordination and triggers the collision, for example, by adapting operative trajectories 26 to one another.

After tactical destination point 20 has been reached (spatially and temporally), the entry maneuver, and thus also the cooperation for this maneuver, is regarded as ended. The planning now takes place on operative planning level 6, since a collision of operative trajectories 26 is possible due to the small distance between the two vehicles 10, 12, for which reason this level, as the lowest cascade level with a collision, has coordination sovereignty.

Tactical planning level 4 may be in a so-called autopilot mode in which it computes destination points (spatial and temporal) along strategic route 22, and tactical trajectories 24 (along the center of the lanes) to these destination points, and relays them to operative planning level 6 as the basis for planning. Vehicles 10, 12 continue to exchange messages, for example to be able to coordinate a cooperative braking or evasive maneuver in the event of an obstacle that suddenly appears.

The described coordination method may likewise be applied to entry and turn scenarios. In scenarios in which, for example, the traffic is to be detoured due to a traffic jam situation or to reduce the load from exhaust gas emissions, the cooperative coordination takes place, for example, solely on strategic planning level 4. The two other planning levels 2, 6 may be in autopilot mode. This means that tactical planning level 4 computes destination points 20 (spatial and temporal) along strategic route 22 and associated tactical trajectories 24 (along the center of the lanes), which are relayed to operative planning level 6 for planning operative trajectories, which in turn are further relayed to the vehicle actuator system.

What is claimed is:

1. A method for maneuver planning and implementation for a vehicle by a vehicle-internal control unit, the method comprising:
when at least one planning level is executed, carrying out an information exchange with another vehicle-internal control unit of at least one neighboring vehicle via a communication link to ascertain collisions, wherein the control unit and the another control unit each include a plurality of planning levels including a strategic planning level for carrying out route planning, a tactical planning level for providing lane-accurate trajectories to possible destination points, and an operative planning level for selecting a destination point and a negotiable trajectory to the selected destination point, the planning levels having a cascading arrangement; and
when a collision is ascertained in at least one planning level, carrying out a maneuver coordination between the vehicle and the at least one neighboring vehicle via the communication link;
wherein the information exchange takes place between the control units of the vehicles, and
wherein a strategic planning level is used for long-term route planning for a final driving destination of the vehicle, wherein a tactical planning level subsequent to the strategic planning level generates destination point specifications and/or selects cooperation partners, wherein the tactical planning level is used for medium-term planning of the route, and wherein an operative planning level subsequent to the tactical planning level is used for short-term or immediate maneuver planning for a time frame of 0 to 10 seconds.

2. The method as recited in claim 1, wherein the communication link is being established between the vehicle and the at least one neighboring vehicle to carry out a cooperative maneuver coordination when a collision is ascertained in at least one of the planning levels.

3. The method as recited in claim 1, wherein when the collision is ascertained in at least one of the planning levels, each planning level above the planning level at which the collision is ascertained is not taken into account in the maneuver coordination.

4. The method as recited in claim 1, wherein the vehicle and the at least one neighboring vehicle are selected as cooperation partners when the collision is ascertained in at least one of the planning levels of at least one of the vehicle and the at least one neighboring vehicle.

5. The method as recited in claim 1, wherein when the collision is ascertained, the maneuver coordination between the vehicle and the at least one neighboring vehicle is carried out by adapting a trajectory of at least one of the vehicle and the at least one neighboring vehicle.

6. The method as recited in claim 1, wherein the communication link between the vehicle and the at least one neighboring vehicle is maintained after the maneuver coordination is carried out.

7. The method as recited in claim 1, wherein the information exchange includes planned trajectories with destination points and destination times.

8. The method as recited in claim 1, further comprising:
determining, in the tactical planning level, which of the vehicle and the at least one neighboring vehicle is a preceding vehicle in a collision area.

9. The method as recited in claim 1, wherein for at least one collision that is determined in the planning level: a lowest of the planning levels that includes the collision is used for a cooperative maneuver coordination, and (ii) a higher of the planning levels is operated in an automated mode.

10. A control apparatus for controlling at least one vehicle and for establishing a communication link between the at least one vehicle and a further vehicle, comprising:
a control unit configured to maneuver planning and implementation for the at least one vehicle, wherein the control unit includes a plurality of planning levels including a strategic planning level for carrying out route planning, a tactical planning level for providing lane-accurate trajectories to possible destination points, and an operative planning level for selecting a destination point and a negotiable trajectory to the selected destination point, the planning levels having a cascading arrangement;
wherein when at least one planning level is executed, carrying out an information exchange with another vehicle-internal control unit of the further vehicle via a communication link to ascertain a collision, wherein the another control unit includes a plurality of planning levels including a strategic planning level for carrying out route planning, a tactical planning level for providing lane-accurate trajectories to possible destination points, and an operative planning level for selecting a destination point and a negotiable trajectory to the selected destination point, the planning levels having a cascading arrangement; and
wherein when a collision is ascertained in at least one planning level, carrying out a maneuver coordination between the vehicle and the further vehicle via the communication link;
wherein the information exchange takes place between the control units of the vehicles, and
wherein a strategic planning level is used for long-term route planning for a final driving destination of the vehicle, wherein a tactical planning level subsequent to the strategic planning level generates destination point specifications and/or selects cooperation partners, wherein the tactical planning level is used for medium-term planning of the route, and wherein an operative planning level subsequent to the tactical planning level is used for short-term or immediate maneuver planning for a time frame of 0 to 10 seconds.

* * * * *